Feb. 20, 1934.  H. V. JOHNSON  1,948,382
OXIDATION RESISTING CARBON ARTICLE
Filed Sept. 2, 1931
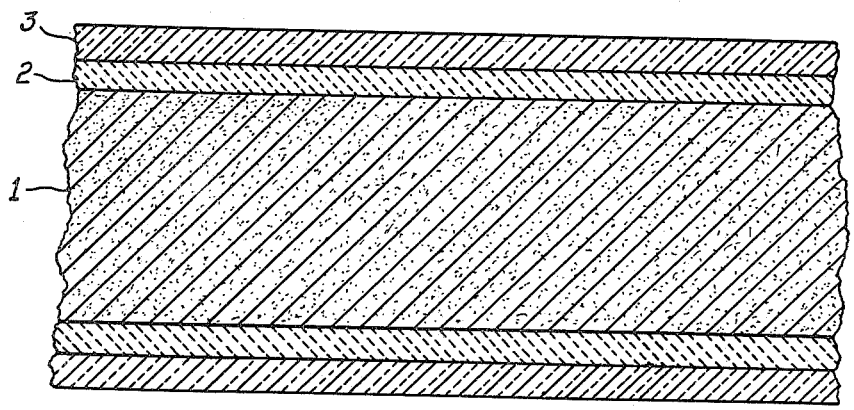
INVENTOR.
Harry V. Johnson,
BY
Bruce Townsend & Potter,
ATTORNEYS.

Patented Feb. 20, 1934

1,948,382

UNITED STATES PATENT OFFICE 1,948,382

OXIDATION RESISTING CARBON ARTICLE

Harry V. Johnson, Niagara Falls, N. Y., assignor to National Carbon Company, Inc., a corporation of New York Application September 2, 1931. Serial No. 560,857

4 Claims. (Cl. 201—75)

This invention relates to an article of carbon which is adapted to resist oxidation at high temperatures. While the articles formed in accordance with my invention are especially adapted for use in forming resistors and especially resistors used as a source of heat, they are also adapted for use in other situations where they are subjected to the influences of high temperatures and oxidizing gases.

The article may be composed of amorphous carbons of various forms or of graphite and may contain admixtures of other substances, for instance materials to decrease their conductivity.

In the past many attempts have been made to cover graphite or amorphous carbon with a protective layer so that it would resist oxidation at elevated temperatures and could be used as a resistor for heating furnaces and in various other applications. A serious difficulty in applying a protective coating to the carbon lies in the fact that a large number of substances, otherwise suitable, do not wet the surface of the carbon.

It is well known that a layer of silicon carbide (SiC) or silicon oxycarbide (SiOC) formed on the surface of the carbon gives some protection from oxidation, but this protection is insufficient due to the fact that the coating is porous and a thin coating permits oxygen to penetrate to the main body of carbon. If a coating of sufficient thickness to provide protection be used, there is a considerable tendency for the coating to crack when subjected to temperature changes.

I have found that a thin coating, which is not in itself sufficient to give protection, forms an admirable base upon which to apply other protective coatings, such as glazes. These glazes may be of such a mixture that they are either solid or molten at the temperatures that occur during service, and if solid they are so chosen that the coefficient of expansion of the glaze is very near that of the carbon material beneath it.

The invention will be described in connection with the accompanying drawing, in which the single figure is a cross-section of a typical resistor prepared in accordance with one embodiment of my invention. In this drawing the resistor body 1 of carbon, graphite or similar carbonaceous material is coated with a thin layer 2 of SiC or SiOC which in turn is coated with a suitable glaze 3.

The layers of the carbide of silicon and the glaze may be relatively much thinner than as shown in the drawing, and the article may of course be in any desired size, form or cross-sectional shape.

In carrying out my invention I prefer to form the preliminary coating by packing the carbon article in SiC, with or without SiOC, containing a slight excess of Si or an excess of $SiO_2$ plus carbon. By an excess of Si or $SiO_2$ I mean more than enough Si or $SiO_2$ to combine chemically with all free carbon present except the carbon article being treated; the excess may be from about 1% to about 10%. The assembly is heated to and held for several hours at a temperature of from about 1200° C. to about 1500° C. This may be done by means of external heat but in many instances I prefer to do this by passing a sufficient current through the article itself to bring the article to the desired heat. While it has been found that a very thin coating such as from about 0.01 to 0.05 inches is sufficient to act as a support for the glaze and is preferable because it is much less likely to crack, coatings of any thickness may be used. I have found that the SiC or SiOC coating becomes an integral part of the carbon article, since it shades off gradually from pure silicon compounds on the outside surface to pure carbon on the inside, and cannot be separated from the article.

The glaze is next applied. While there are many different types and varieties of surface glazes which may be used satisfactorily, I have found that one or more fluorides of the alkali or alkaline earth metals, either alone or in combination with one or more of the oxides of boron, silicon, aluminum, phosphorus, magnesium, calcium, or zirconium are especially suitable for the formation of these protective glazes. Specific compositions which I have found to be excellent are for example: 42% of $CaF_2$, 42% of $B_2O_3$ and 16% of NaF; or 12.5% of NaF, 56% of $B_2O_3$ and 31.5% of $CaF_2$; or 8.7% of NaF, 39.2% of $B_2O_3$, 22.1% of CaF, and 30% of $Al_2O_3$.

In applying the glaze, the materials are finely powdered and blended in a dry state, after which sufficient water is added to form a thin paste which is applied to the surface to be glazed by brushing, spraying, dipping, or other suitable means. Heat is applied slowly until all the water is driven off, after which the heating can be much faster. The heating should be continued until the fusion temperature of the glaze is reached. Even though the mixture is one which fuses below the temperature at which the resistor is designed to be used, the glaze may well be one which remains quite viscous and shows no sign of running off the surface at temperatures as high as 1800° C. Should it be decided to use the article at the higher temperatures, the mixture for the glaze should of course preferably contain materials having a high fusing temperature. I have found that mixtures containing $Al_2O_3$ and $MgO$ are particularly suitable when higher temperatures are encountered. Many other mixtures will serve to form the glaze, but in selecting the mixture care should be taken that the glaze should have an expansion coefficient as close to that of the carbon articles as possible, and if molten that it should not dissolve oxygen; that none of the constituents should react with C, SiC, or SiOC at the temperature used; and that they should adhere well to the coating of SiC or SiOC throughout the useful temperature range.

The composite protective coatings of my invention I have found to give protection at temperatures at which unprotected carbon would burn very rapidly in oxidizing gases. The degree of protection varies of course with the temperature and with the composition of glaze used, but I have found that with the use of one of the better glazes, as exemplified above, satisfactory protection is secured under most conditions at temperatures up to about 1800° C.

It will be realized that many variations in the details of the methods of applying the coatings of my invention, and in the compositions of those coatings, are possible without departing from the spirit of my invention. Therefore I do not wish to be limited to or by the specific examples herein disclosed, but only by the prior art and the appended claims.

I claim:—

1. An oxidation resistant carbon article comprising a body predominantly of carbon, a coating containing silicon carbide on said article, said coating being approximately 0.01 to 0.05 inch thick, and a glaze on said coating, said glaze comprising at least one of the fluorides of the alkali and alkali earth metals in combination with the oxide or oxides of at least one of the following: boron, silicon, aluminum, phosphorus, magnesium, calcium.

2. An oxidation resistant carbon article comprising a body predominantly of carbon, a coating containing silicon oxycarbide on said article, said coating being approximately 0.01 to 0.05 inch thick, and a glaze on said coating, said glaze comprising at least one of the fluorides of the alkali and alkali earth metals in combination with the oxide or oxides of at least one of the following: boron, silicon, aluminum, phosphorus, magnesium, calcium.

3. An oxidation resistant carbon article comprising a body predominantly of carbon, a silicious coating on said body, the coating being not more than about 0.05 inch thick, and a glaze on said coating, said glaze comprising at least one of the fluorides of the alkali and alkali earth metals.

4. An oxidation resistant carbon article comprising a body predominantly of carbon, a silicious coating on said body, the coating being not more than about 0.05 inch thick, and a glaze on said coating, said glaze comprising at least one of the fluorides of the alkali and alkali earth metals in combination with the oxide or oxides of at east one of the following: boron, silicon, aluminum, phosphorus, magnesium, calcium.

HARRY V. JOHNSON.